United States Patent [19]

Nakamura et al.

[11] Patent Number: 4,524,357
[45] Date of Patent: Jun. 18, 1985

[54] APPARATUS FOR VISUALLY INDICATING THE CURRENT LOCATION OF AN AUTOMOTIVE VEHICLE

[75] Inventors: Yukinobu Nakamura; Katsutoshi Tagami; Tsuneo Takahashi, all of Saitama, Japan

[73] Assignee: Honda Giken Kogyo Kabushiki Kaisha, Tokyo, Japan

[21] Appl. No.: 408,285

[22] Filed: Aug. 16, 1982

[30] Foreign Application Priority Data

Aug. 24, 1981 [JP] Japan .................. 56-132451

[51] Int. Cl.³ .................................. G08G 1/12
[52] U.S. Cl. .......................... 340/995; 33/356; 73/505
[58] Field of Search ............ 340/23, 24, 995, 988; 364/457, 571, 460, 449, 450; 73/178 R, 516 LM, 1 E, 504, 505; 33/356; 343/451, 452

[56] References Cited

U.S. PATENT DOCUMENTS

| | | | |
|---|---|---|---|
| 2,574,471 | 11/1951 | Fragola | 33/356 |
| 4,031,630 | 6/1977 | Fowler | 73/1 E |
| 4,032,758 | 6/1977 | Lewis | 364/457 |
| 4,347,730 | 9/1982 | Fisher | 73/178 R |
| 4,402,050 | 8/1930 | Tagami | 364/460 |

Primary Examiner—James J. Groody
Attorney, Agent, or Firm—Irving M. Weiner; Pamela S. Burt

[57] ABSTRACT

A current location indicating apparatus for use in an automotive vehicle wherein a current location of the vehicle is arithmetically obtained in terms of two-dimensional coordinates by a signal processing unit on the basis of the outputs from a travel distance detecting unit and a bearing detecting unit, and the current location of the vehicle is visually indicated on the screen of a display unit from the thus-obtained data in connection with the current location of the vehicle. The apparatus comprises a first bearing detecting unit comprising a rate type gyroscope as a main unit, and a second detecting unit comprising an earth magnetism sensor. The signal processing unit is adapted to monitor the outputs from the first and second bearing detecting means in comparison with each other to determine whether or not the first bearing detecting unit is under the influence of any disturbances, whereby the output of the first bearing detecting unit can be corrected so as to be free from any substantial disturbances during operation.

1 Claim, 2 Drawing Figures

APPARATUS FOR VISUALLY INDICATING THE CURRENT LOCATION OF AN AUTOMOTIVE VEHICLE

BACKGROUND OF THE INVENTION

1. Field of the Invention

The present invention relates generally to a device for visually indicating a current location of a vehicle. More particularly, the invention relates to an improved apparatus for determining and visually indicating a current location of an automotive vehicle to the driver thereof, wherein a stable and quick-start locating operation is attained from the combination of an earth magnetism sensor and a rate type gyroscope by the selection of one of the two which suits the particular situation at hand.

2. Description of Relevant Art

A known apparatus has been developed for the determination and visual indication of a current location of an automotive vehicle to the driver thereof, which comprises a travel distance counter section adapted to determine the current mileage or travel distance of an automotive vehicle in terms of, for example, its travel speed, and a bearing detector section adapted to detect the current orientation and extent of azimuthal deviation of the vehicle in accordance with its travel direction per a given distance from its starting point. The current location of the vehicle along its travel route is obtained arithmetically from the thus-obtained detection data, the result of which calculation is visually indicated on a display for the driver of the vehicle by way of spot information varying from time to time upon a suitable road map shown on the display indicating the travel route along which the vehicle is currently travelling.

In the aforesaid known apparatus for visually indicating a current location of an automotive vehicle, there is employed a rate type gyroscope or the like adapted to detect a possible angular velocity produced about the axis of yawing motion of the vehicle, so as to detect a current relative relationship such as, for example, a current angular relationship between the orientation of a current horizontal component of the earth magnetism and a current travel direction of the vehicle.

In such a bearing detecting apparatus which employs a rate type gyroscope, errors are likely to be accumulated during the bearing detecting operation as developed from possible drifts of the gyroscope during vehicle operation to such an extent that information obtained from the thus-accumulated errors presents an erroneous location indication of the vehicle on the display screen, despite the fact that such a system is advantageously inherently immune from disturbances such as earth magnetism as experienced when an earth magnetism sensor is employed for the bearing detection of the automotive vehicle.

Also known to those skilled in the art is a bearing detecting apparatus of an earth magnetism sensor type which presents by way of the earth magnetism a current relative relationship between the current horizontal component of the earth magnetism and the current orientation of the vehicle with a relatively reliable operation on the average over a long distance, because it can consistently present the absolute orientation of the vehicle with respect to the current location thereof, unlike the apparatus employing the rate type gyroscope. In contrast, however, from a short-term standpoint, such an apparatus of the earth magnetism sensor type is inconveniently substantially susceptible to external disturbances such as from a railroad crossing or an iron bridge as the vehicle passes thereby, or such as when a large-sized truck travels near to the vehicle, so that the display at the driver's seat presents undesired incorrect information on a current location of the vehicle which would very possibly deviate from a predetermined course of travel due to thus-far accumulated errors in the location detecting operation.

When the vehicle is under the foregoing conditions, it is very difficult or even impossible for the driver of the vehicle to determine whether the displayed information on the screen is incorrect or if his vehicle is actually travelling in a different or incorrect way, thus resulting in substantial ambiguity.

The present invention effectively overcomes the aforesaid inconveniences and difficulties experienced with the conventional location detecting apparatus for use in an automotive vehicle.

SUMMARY OF THE INVENTION

It is a primary object of the present invention to provide an improved location detecting apparatus for use in an automotive vehicle which can afford both a quick-start initial operation and stable continuous operation in location detection functioning with a substantial insensitivity to any disturbances from the environment in the proximity of the vehicle.

It is another object of the present invention to provide an improved location detecting apparatus for an automotive vehicle which incorporates an earth magnetism sensor and a rate type gyroscope or the like as a primary unit, the former serving a quick-start function in the location detecting operation of an automotive vehicle immediately upon power-up without the necessity of a rising time wait until the system reaches stability in performance, and the latter presenting a substantial insensitivity to disturbances from the environment surrounding the vehicle. It is thus possible to readily correct any accumulated errors in the output from the rate type gyroscope, which may develop from drifts thereof during vehicle operation, by comparison with the output from the earth magnetism sensor. With such advantageous combination of the two bearing detecting elements having relatively compensating features, there is provided a due bearing detection of the vehicle with a constantly high precision in indication.

The present invention provides an improved location detecting apparatus for use in an automotive vehicle wherein a current location of the automotive vehicle is arithmetically obtained in terms of two-dimensional coordinates by a singal processing unit on the basis of the outputs from a travel distance detecting unit and a bearing detecting unit, and the current location of the vehicle is visually indicated on the screen of a display from the thus-obtained data in connection with the current location thereof. The apparatus comprises, in operative combination, a first bearing detecting unit of a rate type gyroscope type as a primary unit, and a second detecting unit which is of an earth magnetism sensor type, and wherein the signal processing means is adapted to monitor the outputs from the first and second bearing detecting means in comparison with each other to determine whether or not errors in the output of the first bearing detecting means have accumulated, whereby the output of the first bearing detecting means can be corrected during operation.

The above and further objects, details and advantages of the present invention will become apparent from the following detailed description, when read in conjunction with the accompanying drawings.

DETAILED DESCRIPTION OF PREFERRED EMBODIMENTS

Figure 1:
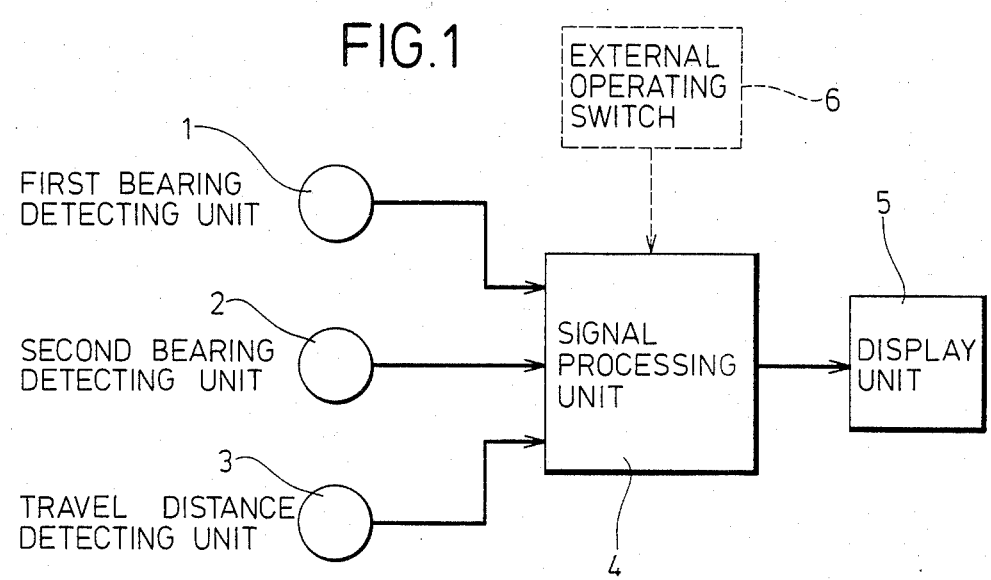
FIG. 1 is a schematic block diagram showing the basic construction of the current location detecting apparatus in accordance with a preferred embodiment of the present invention.

With reference to FIG. 1, there is schematically shown the typical and basic construction of an improved current location detecting apparatus for use in an automotive vehicle according to a preferred embodiment of the present invention. The apparatus includes a first bearing detecting unit 1 which comprises a bearing detector such as, for example, a rate type gyroscope adapted to generate electric signals in proportion to a current quantity of azimuthal deviation from the current bearing of the automotive vehicle, a second bearing detecting unit 2 which comprises an earth magnetism sensor adapted to generate electric signals indicating the absolute bearing data in accordance with the current travel direction of the vehicle, and a travel distance detecting unit 3 which comprises, for example, a sensor or pulse generator of a photoelectric, electromagnetic or mechanical contact type and adapted to produce signals corresponding to a current travel distance or number of revolutions of the wheels of the vehicle. A signal processing unit 4 is adapted to count the number of electric pulses from the distance detecting unit 3 so as to measure the current travel distance of the vehicle, determine the current travel direction of the vehicle from the bearing detecting unit 1 and then arithmetically obtain a current location of the vehicle in two-dimensional coordinates at an interval of the unit travel distance of the vehicle, while at times compensating the output from the first bearing detecting unit 1 with that from the second bearing detecting unit 2, and at the same time centrally controlling the entire apparatus. A display unit 5 comprises a CRT display, a liquid crystal display, or the like, adapted to visually indicate information as updated from time to time on a current location of the vehicle as varying from time to time in terms of the two-dimensional coordinates as obtained from the signal processing unit 4.

In this particular construction of the current location detecting apparatus according to the invention, it is to be noted that the signal processing unit 4 is adapted to monitor the output from the first bearing detecting apparatus 1 in comparison with the operating state of the second bearing detecting apparatus 2 to determine whether or not errors in the output of the rate type gyroscope of the first bearing detecting unit 1 have accumulated during the bearing detecting operation due to drifts thereof during vehicle operation, in such a manner that the outputs of both the first and second bearing detecting units 1 and 2 may correspond with each other, or that if there is found any substantial difference in the outputs of the first and second bearing detecting units greater than a predetermined threshold level, the output of the first bearing detecting unit 1 is corrected automatically so that it may be reduced to be equal to or smaller than such threshold value, accordingly.

In addition, there may be provided an external operating switch 6 which is adapted to allow the operator or driver of the vehicle to manually give a necessary command for correction of the difference in the outputs of the bearing detecting units to the signal processing unit 4, when necessary. In this connection, such command may be given manually by the driver of the vehicle in such a manner that the signal processing unit 4 compares the outputs of the first bearing detecting unit 1 and the second bearing detecting unit 2 and then corrects the output of the first bearing detecting unit 1 so that the difference in the two outputs may be rendered equal to or smaller than the predetermined threshold level.

On the other hand, in view of the possibility that the earth magnetism sensor in the second bearing detecting unit 2 may happen to be under the effect of external disturbances in connection with the automatic correction procedure with respect to the output of the first bearing detecting unit 1 conducted at a certain interval by the signal processing unit 4 as described above, by virtue of the manual correcting operation by way of the external operation switch 6, the output adjustment of the first bearing detecting unit 1 may be conducted accordingly in priority to the automatic correction procedure by the signal processing unit 4 in accordance with the current operation conditions of the vehicle.

More specifically, in connection with the automatic output correction for the first bearing detecting unit 1 to be conducted by the signal processing unit 4, it is also feasible in practice to provide a sensor which is adapted to detect a current condition of the vehicle, for example, a stopping condition of the vehicle, instead of the regular interval of output correction procedures as described above. Such a sensor may give an output for causing the signal processing unit 4 to occasionally correct the output of the first bearing detecting unit 1 in accordance with the output of the second bearing detecting unit 2 in reflection of the current stopping condition of the vehicle, when so desired.

Figure 2:
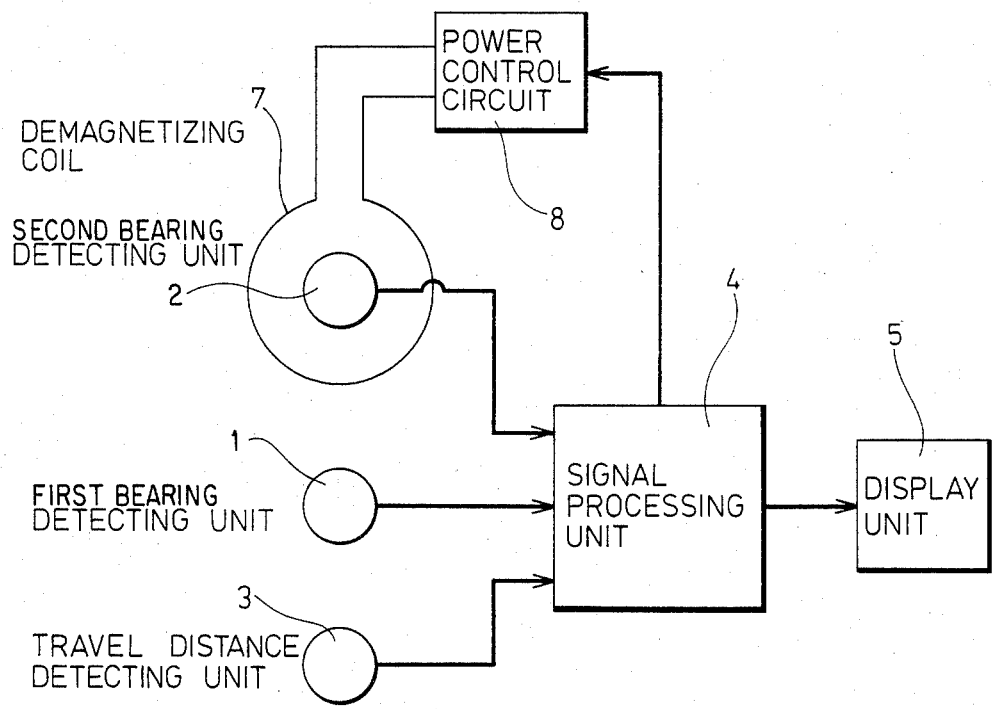
FIG. 2 is a block diagram showing a typical example of the circuit construction of the bearing detecting apparatus according to the invention.

Referring now to FIG. 2 which shows another embodiment of the present invention, there is provided a demagnetizing coil 7 disposed in the proximity of the earth magnetism sensor of the second bearing detecting unit 2 together with a power control circuit 8 for the demagnetizing coil 7. In such circuit construction, the power supply circuit 8 is arranged to be fed with a demagnetizing command from the signal processing unit 4, when the first bearing detecting unit 1 is to be compensated in its output, so that the demagnetizing coil 7 may correctively be energized to such an extent that the effect of magnetic disturbances rendered upon the earth magnetism sensor may be cancelled or offset, thus enabling the second bearing detecting unit 2 to effect a due bearing detecting operation free from any substantial disturbances. In this connection, it is of course feasible in practice to add a manual control switch which provides for manual adjustment of the demagnetizing device in accordance with the operating status of the automotive vehicle, as desired.

As described in detail hereinabove, according to the present invention there is provided an improved current location indicating apparatus for use in an automotive vehicle wherein a current location of the automotive vehicle in terms of two-dimensional coordinates may be obtained arithmetically by means of the signal processing on the basis of the outputs from the travel distance detector and from the first and second bearing detecting units, and the current location of the vehicle is visually indicated on the screen of the display from the thus-obtained data in connection with the current location. The apparatus comprises, in operative combination, the first bearing detecting unit 1 which comprises the rate type gyroscope as the main unit for detecting the bearing status of the vehicle, together with the second bearing detecting unit 2 which comprises the earth magnetism sensor, and the signal processing unit which is adapted to monitor the outputs from the first and second bearing detecting units in due comparison with each other to determine whether or not errors in the output of the rate type gyroscope of the first bearing detecting unit have accumulated during the bearing detecting operation due to drifts thereof during operation of the vehicle, so that the output of the first bearing detecting unit can immediately be compensated for a due correction in accordance with the output from the second bearing detecting unit 2 upon the detection of any such errors. In this manner, the constantly accurate visual indication of a current location of the vehicle is assured, which would otherwise not be possible for the rate type gyroscope when provided alone.

It will now be understood that the objects as set forth hereinabove among those made apparent from the preceding description are efficiently attained, and because certain changes and modifications may be made in the foregoing without departing from the spirit and scope of the invention, it is intended that all matter contained in the foregoing description or shown in the accompanying drawings shall be interpreted as illustrative and not limiting.

It is also to be understood that the appended claims are intended to cover all of such generic and specific features particular to the invention as disclosed herein and all statements relating to the scope of the invention which might be said to fall thereunder.

We claim:

1. A current location indicating apparatus for use in an automotive vehicle wherein a current location of said vehicle is arithmetically obtained in terms of two-dimensional coordinates by signal processing means on the basis of the outputs from travel distance detecting means and bearing detecting means, and said current location of said vehicle is visually indicated on the screen of display means from the thus-obtained data in connection with the current location of said vehicle, which comprises, in operative combination:

first bearing detecting means which comprises a rate type gyroscope as a primary unit;

second detecting means which comprises an earth magnetism sensor; and wherein said signal processing means is adapted to continuously monitor the outputs from said first and second bearing detecting means in comparison with each other to deterine whether or not errors in the output of said rate type gyroscope have accumulated during bearing detecting operation due to possible drifts thereof during vehicle operation, whereby the output of said first bearing detecting means can be automatically immediately corrected while said vehicle is in motion.

* * * * *